US009534531B2

United States Patent
Benjey et al.

(10) Patent No.: US 9,534,531 B2
(45) Date of Patent: Jan. 3, 2017

(54) SUPERCHARGER ASSEMBLY FOR REGENERATION OF THROTTLING LOSSES AND METHOD OF CONTROL

(71) Applicant: EATON CORPORATION, Cleveland, OH (US)

(72) Inventors: Robert Philip Benjey, Dexter, MI (US); William Nicholas Eybergen, Macomb County, MI (US); Roneesh Vashisht, Dallas, TX (US); Martin D. Pryor, Canton, MI (US)

(73) Assignee: Eaton Corporation, Cleveland, OH (US)

( * ) Notice: Subject to any disclaimer, the term of this patent is extended or adjusted under 35 U.S.C. 154(b) by 171 days.

(21) Appl. No.: 14/348,303

(22) PCT Filed: Sep. 28, 2012

(86) PCT No.: PCT/US2012/057702
§ 371 (c)(1),
(2) Date: Mar. 28, 2014

(87) PCT Pub. No.: WO2013/049435
PCT Pub. Date: Apr. 4, 2013

(65) Prior Publication Data
US 2014/0224228 A1    Aug. 14, 2014

Related U.S. Application Data

(60) Provisional application No. 61/541,593, filed on Sep. 30, 2011, provisional application No. 61/683,939, filed on Aug. 16, 2012.

(51) Int. Cl.
*F02B 33/00* (2006.01)
*F02B 33/06* (2006.01)
(Continued)

(52) U.S. Cl.
CPC ............. *F02B 33/06* (2013.01); *B60K 6/485* (2013.01); *F02B 33/32* (2013.01); *F02B 33/446* (2013.01); *Y02T 10/6226* (2013.01)

(58) Field of Classification Search
CPC .......... B60K 6/485; F02B 33/06; F02B 33/32; F02B 33/446; Y02T 10/6226
See application file for complete search history.

(56) References Cited

U.S. PATENT DOCUMENTS

| | | |
|---|---|---|
| 1,752,224 A | 3/1930 | Apple |
| 2,358,815 A | 9/1944 | Lysholm |

(Continued)

FOREIGN PATENT DOCUMENTS

| | | |
|---|---|---|
| CN | 1982670 A | 6/2007 |
| CN | 101326068 A | 12/2008 |

(Continued)

OTHER PUBLICATIONS

International Search Report for corresponding International Patent Application PCT/US2012/057702 mailed Dec. 3, 2012.
(Continued)

*Primary Examiner* — Jesse Bogue
(74) *Attorney, Agent, or Firm* — Merchant & Gould P.C.

(57) ABSTRACT

An engine assembly is provided that includes an engine throttle and a supercharger placed in series with one another in air flow to the engine. The throttle and supercharger can be controlled so that throttling losses are selectively distributed across the throttle and/or the supercharger. Throttling losses placed across the supercharger can create torque that can be converted to stored energy.

17 Claims, 6 Drawing Sheets

(51) Int. Cl.
*B60K 6/485* (2007.10)
*F02B 33/32* (2006.01)
*F02B 33/44* (2006.01)

(56) References Cited

U.S. PATENT DOCUMENTS

| | | | |
|---|---|---|---|
| 2,390,487 | A | 12/1945 | Lawrence et al. |
| 2,400,306 | A | 5/1946 | Hobbs |
| 2,441,779 | A | 5/1948 | Troeger et al. |
| 2,965,083 | A | 12/1960 | Percival |
| 2,975,963 | A | 3/1961 | Nilsson |
| 3,184,155 | A | 5/1965 | Crooks |
| 3,676,999 | A | 7/1972 | Oldfield |
| 3,804,565 | A | 4/1974 | Sennet |
| 4,068,984 | A | 1/1978 | Spindler |
| 4,083,188 | A | 4/1978 | Kumm |
| 4,478,043 | A | 10/1984 | Kobavashi et al. |
| 4,729,225 | A | 3/1988 | Bucher |
| 4,825,839 | A | 5/1989 | Mehnert |
| 5,121,607 | A | 6/1992 | George, Jr. |
| 5,125,806 | A | 6/1992 | Quick et al. |
| 5,158,427 | A | 10/1992 | Shirai |
| 5,195,881 | A | 3/1993 | George, Jr. |
| 5,241,817 | A | 9/1993 | George, Jr. |
| 5,263,832 | A | 11/1993 | Yamaguchi |
| 5,713,204 | A | 2/1998 | Kadlicko |
| 5,890,468 | A | 4/1999 | Ozawa |
| 8,087,401 | B2 * | 1/2012 | Inoue .................. F02B 33/40 123/559.1 |
| 8,151,773 | B2 * | 4/2012 | Prior .................. F02B 33/38 123/559.1 |
| 8,196,686 | B2 | 6/2012 | Grieve |
| 2004/0237949 | A1 | 12/2004 | Yasui |
| 2007/0051349 | A1 | 3/2007 | Marumoto et al. |
| 2007/0137626 | A1 | 6/2007 | Turner |
| 2008/0087482 | A1 | 4/2008 | Ledger et al. |
| 2008/0173017 | A1 * | 7/2008 | St. James ............. F02B 33/40 60/608 |
| 2008/0289610 | A1 | 11/2008 | Nguyen-Schaefer et al. |
| 2008/0312803 | A1 | 12/2008 | Igarashi et al. |
| 2009/0048745 | A1 | 2/2009 | Wu et al. |
| 2009/0222188 | A1 | 9/2009 | Igarashi |
| 2009/0277215 | A1 | 11/2009 | Tsuboi |
| 2009/0288648 | A1 | 11/2009 | Prior et al. |
| 2009/0291803 | A1 | 11/2009 | Moeller |
| 2010/0071673 | A1 | 3/2010 | Prior |
| 2010/0155157 | A1 | 6/2010 | Grieve |
| 2011/0067395 | A1 | 3/2011 | Suhocki |
| 2011/0094480 | A1 | 4/2011 | Suhocki et al. |
| 2012/0041664 | A1 | 2/2012 | Hansen et al. |
| 2013/0089413 | A1 | 4/2013 | Fujimoto et al. |
| 2013/0090832 | A1 * | 4/2013 | Bevan .................. F02B 37/04 701/102 |
| 2013/0146035 | A1 * | 6/2013 | Eybergen ............. F02B 29/0475 123/562 |
| 2014/0208745 | A1 * | 7/2014 | Suhocki .................. F02B 37/04 60/611 |
| 2014/0238361 | A1 | 8/2014 | Tsourapas et al. |
| 2014/0283797 | A1 * | 9/2014 | Eybergen ............. F02B 33/38 123/559.1 |
| 2015/0260187 | A1 | 9/2015 | Endo et al. |

FOREIGN PATENT DOCUMENTS

| | | |
|---|---|---|
| CN | 201159098 Y | 12/2008 |
| CN | 102072011 A | 5/2011 |
| CN | 202944330 U | 5/2013 |
| DE | 38 01 227 A1 | 11/1988 |
| DE | 39 33 409 A1 | 4/1991 |
| DE | 11 2005 000486 T5 | 1/2007 |
| EP | 0 222 989 A1 | 5/1987 |
| EP | 1 462629 A1 | 9/2004 |
| EP | 1 895 130 A1 | 3/2008 |
| GB | 2 456 600 A | 7/2009 |
| JP | 60-075722 A | 4/1985 |
| JP | 61-004889 A | 1/1986 |
| JP | 61-159689 U | 10/1986 |
| JP | 62-101830 A | 5/1987 |
| JP | 2-24042 U | 2/1990 |
| JP | 3-225028 A | 10/1991 |
| JP | 5-263649 A | 10/1993 |
| JP | 7-097939 A | 4/1995 |
| JP | 2001-073784 A | 3/2001 |
| JP | 2003-161156 A | 6/2003 |
| JP | 2005-042553 A | 2/2005 |
| JP | 2005-054612 A | 3/2005 |
| JP | 2005-188318 A | 7/2005 |
| JP | 2005-291020 A | 10/2005 |
| JP | 2006-083767 A | 3/2006 |
| JP | 2006-233803 A | 9/2006 |
| JP | 2006-258094 A | 9/2006 |
| JP | 2006-307648 A | 11/2006 |
| JP | 2007-016721 A | 1/2007 |
| JP | 2007-104855 A | 4/2007 |
| JP | 2007-192092 A | 8/2007 |
| JP | 2008-063974 A | 3/2008 |
| JP | 2008-215074 A | 9/2008 |
| JP | 2008-215075 A | 9/2008 |
| JP | 2009-243268 A | 10/2009 |
| JP | 2010/065656 A | 3/2010 |
| KR | 2005-0039187 A | 4/2005 |
| KR | 2007-0005461 A | 1/2007 |
| WO | WO 2008/020184 | 2/2008 |
| WO | 2009/136994 A1 | 11/2009 |
| WO | 2013/049438 A2 | 4/2013 |
| WO | 2013/049439 A2 | 4/2013 |

OTHER PUBLICATIONS

International Search Report for corresponding International Patent Application No. PCT/US 2012/057706 mailed Mar. 26, 2013.
International Search Report for corresponding International Patent Application No. PCT/US2012/057709 mailed Mar. 26, 2013.

\* cited by examiner

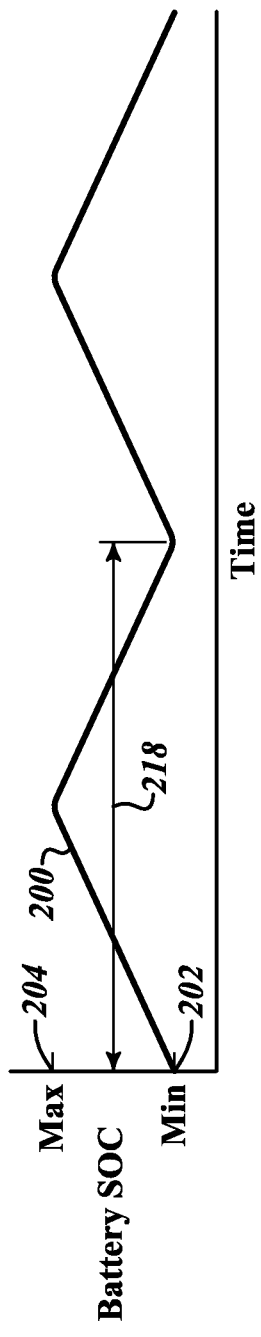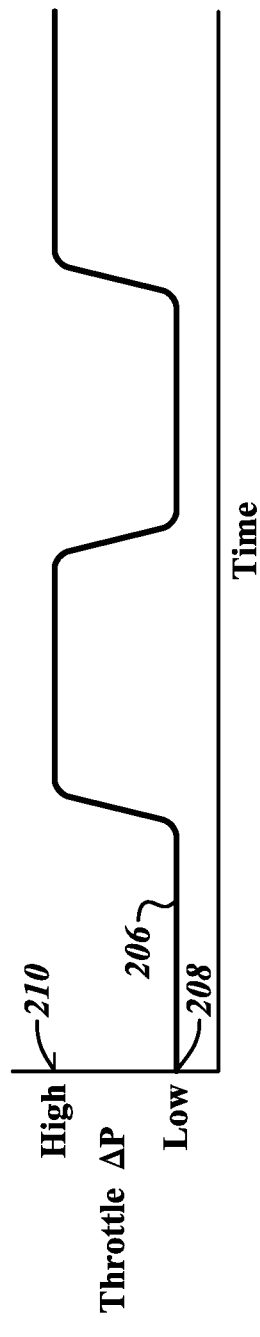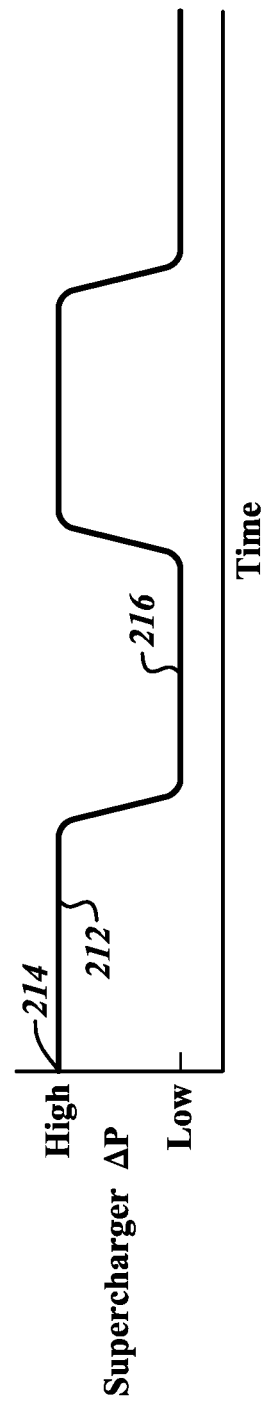

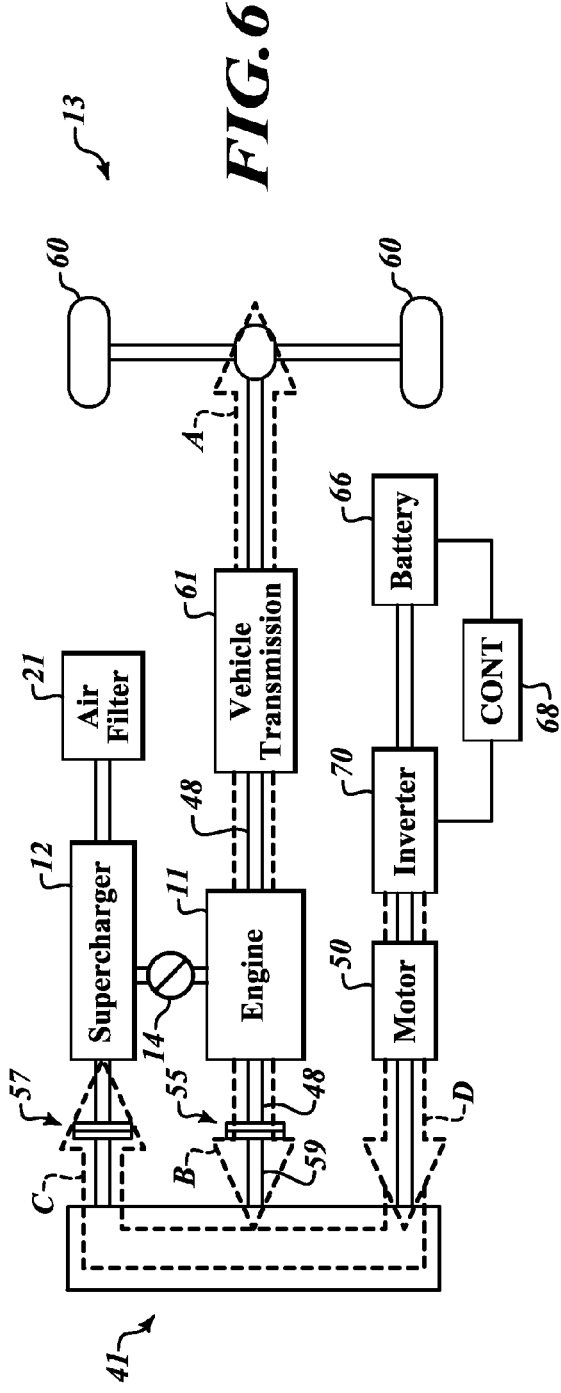
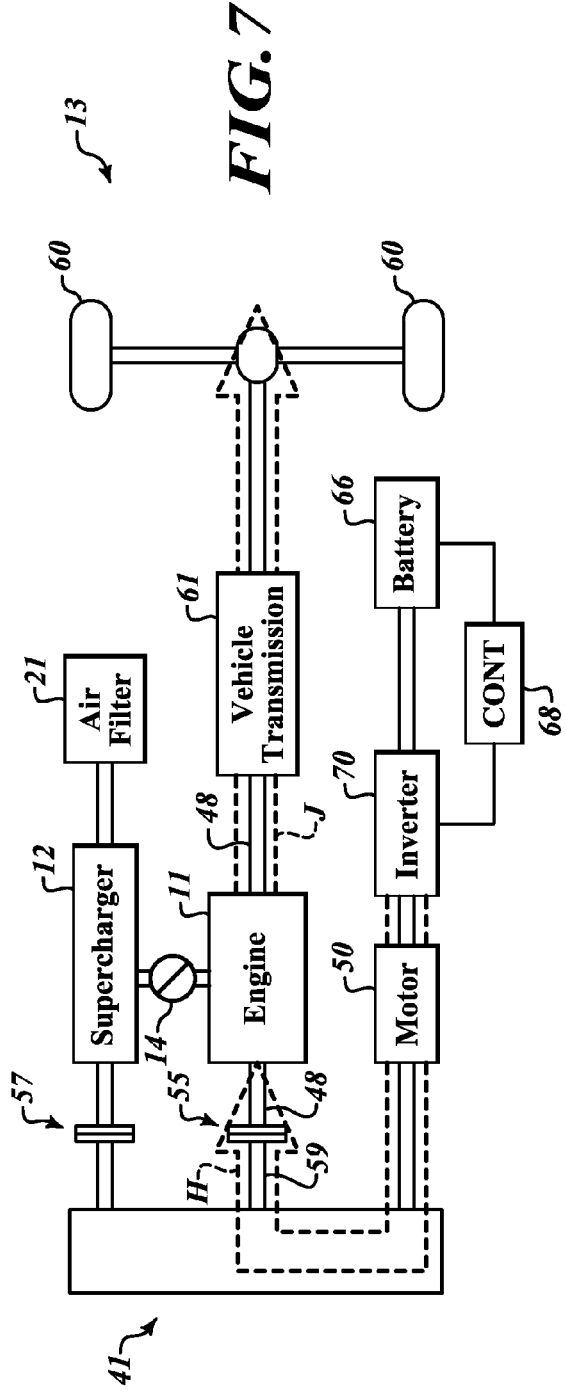

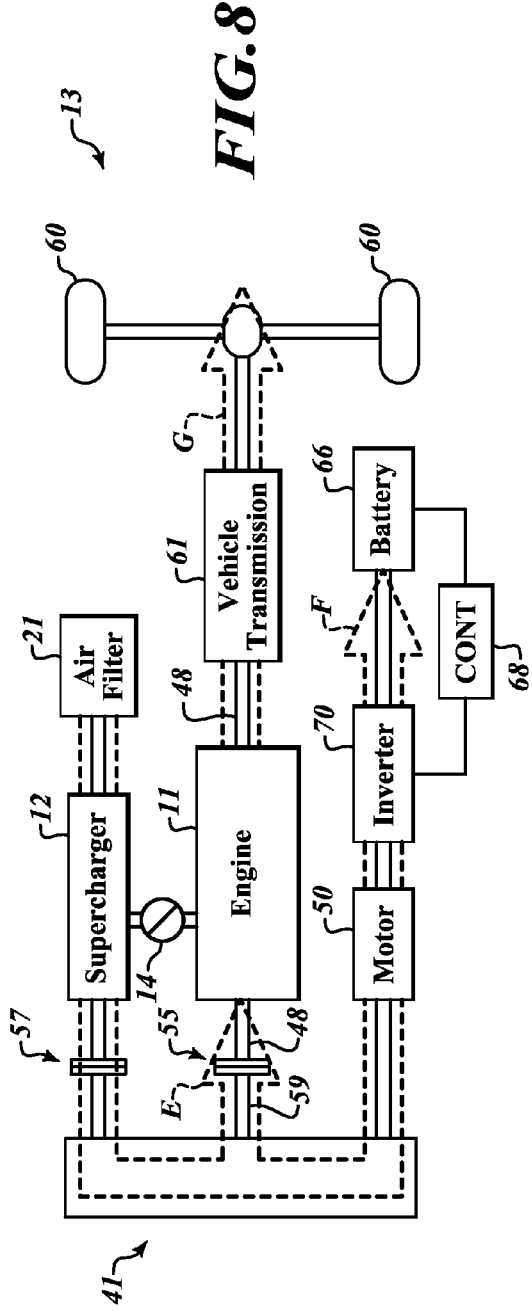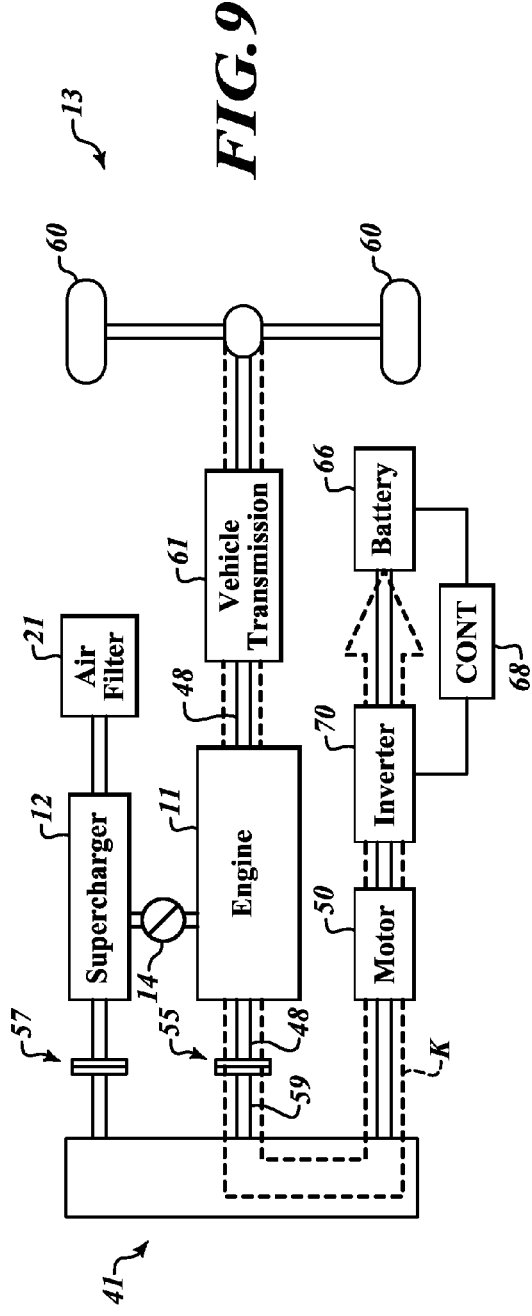

SUPERCHARGER ASSEMBLY FOR REGENERATION OF THROTTLING LOSSES AND METHOD OF CONTROL

RELATED APPLICATIONS

This application is a National Stage Application of PCT/US2012/057702, filed 28 Sep. 2012, which claims benefit of U.S. Patent Application Ser. No. 61/541,593 filed on 30 Sep. 2011 and U.S. Patent Application Ser. No. 61/683,939 filed on 16 Aug. 2012, and which applications are incorporated herein by reference. To the extent appropriate, a claim of priority is made to each of the above disclosed applications.

TECHNICAL FIELD

The present teachings generally include a supercharger placed in series with an engine throttle.

BACKGROUND

Energy efficient engines of reduced size are desirable for fuel economy and cost reduction. Smaller engines provide less torque than larger engines. A supercharger is sometimes used to increase the torque available from an engine. At low engine speeds, when higher torque is often requested by a vehicle operator by depressing the accelerator pedal, the supercharger provides additional air to the engine intake manifold, boosting air pressure and thereby allowing the engine to generate greater torque at lower engine speeds.

SUMMARY

The present teachings generally include an assembly for controlling air flow to an engine. The engine has engine cylinders and has an engine throttle in a throttle body positioned in the air flow to the cylinders. The throttle and supercharger are controlled so the pressure drop that occurs across the throttle is selectively distributed across the throttle and/or the supercharger. The pressure drop is due to the vacuum created by the reciprocating pistons in the engine cylinders and because of the inefficiency created by the turbulence in air flow around the throttle at low throttle (i.e., only partially opened throttle) conditions. The energy associated with the pressure drop across the throttle is typically unused, and so is referred to as "throttling losses". In the assembly, the pressure drop can be placed across the supercharger, causing torque on the supercharger that can be utilized (i.e., the throttling losses are "captured," "regenerated," or "recovered) such as by conversion to stored energy.

More specifically, an assembly for controlling air flow to an engine having a crankshaft, engine cylinders, and a throttle in a throttle body upstream in the air flow to the engine cylinders, includes a supercharger having a set of rotors in series with the throttle in the air flow to the engine. A gear arrangement has a first member operatively connected with a load device, a second member operatively connectable with the engine crankshaft, and a third member operatively connectable with the supercharger. The load device can be a motor/generator, but is not limited to such. The load device is selectively controllable to vary a speed of rotation of the rotors through the gear arrangement to thereby cause the throttle to open. A pressure drop across the throttle then shifts to the rotors, creating torque on the rotors, throttling losses thereby being regenerated.

In one aspect of the present teachings, a controller is operatively connected to the motor/generator and is configured to control the motor/generator to alternately function as a motor and as a generator. A battery is operatively connected to the controller and the motor/generator. The motor/generator can be controlled to function as a generator to convert the torque on the rotors to energy stored in the battery during periods of relatively constant engine speeds when the state-of-charge of the battery reaches a predetermined first level until a state-of-charge of the battery reaches a predetermined second level higher than the first level. When the throttle is less open, so that less of the pressure drop is distributed to the rotors, the motor/generator can then be controlled to function as a motor to provide torque at the crankshaft after the state-of-charge of the battery reaches the predetermined second level until the state-of-charge of the battery again reaches the predetermined first level.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 3 is a plot of a state-of-charge of a battery connected with the motor/generator of FIG. 1 versus time.

FIG. 4 is a plot of pressure drop across the throttle of FIG. 1 versus time.

FIG. 5 is a plot of pressure drop across the supercharger of FIG. 1 versus time.

FIG. 6 is a schematic illustration of a vehicle having the assembly of FIG. 1, depicting a first drive mode providing low end boost during acceleration and a second drive mode providing boost during acceleration with high power demand.

FIG. 7 is a schematic illustration of the vehicle of FIG. 6 depicting a third drive mode with hybrid functionality during vehicle cruising and a fourth drive mode providing engine start/stop functionality and accessory drive by the motor/generator when the engine is stopped.

FIG. 8 is a schematic illustration of the vehicle of FIGS. 6 and 7 depicting a throttling loss regeneration mode.

FIG. 9 is a schematic illustration of the vehicle of FIGS. 6-8 depicting a regenerative braking mode.

DETAILED DESCRIPTION

Figure 1:
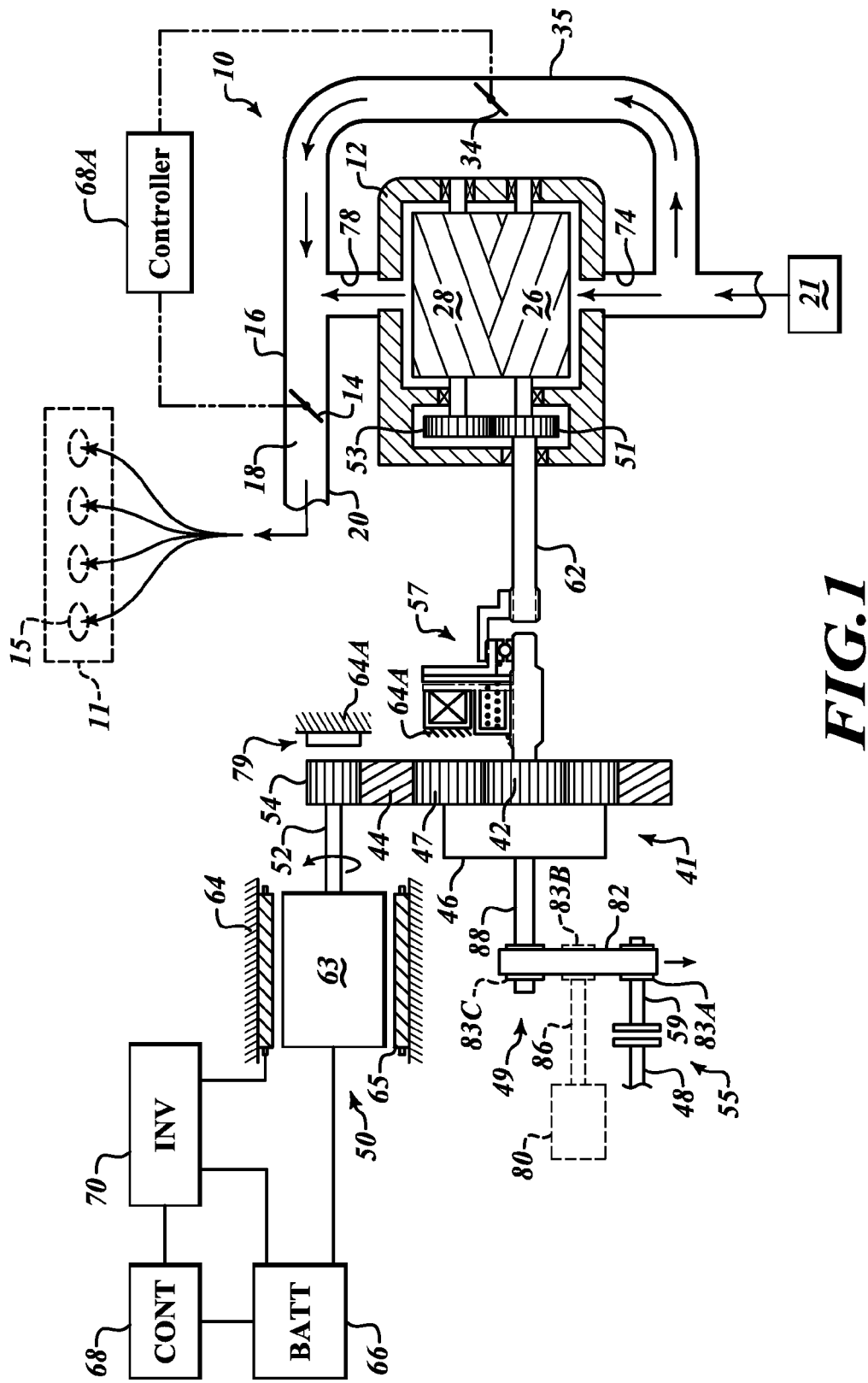
FIG. 1 is a schematic illustration in partial cross-sectional view of an assembly having an engine throttle and a supercharger in series, with a planetary gear set and a motor/generator operatively connectable to the supercharger in accordance with an aspect of the present teachings.

Referring to the drawings, wherein like reference numbers refer to like components throughout the several views, FIG. 1 shows an assembly 10 that includes a supercharger 12 placed in series with a throttle 14 in a throttle body 16 in the air flow upstream of a plenum 18 in an engine air intake manifold 20 through which air is introduced into engine cylinders 15 of an engine 11. The throttle 14 is also referred to herein as a throttle valve. Movement of pistons within the engine cylinders 15 creates a vacuum that pulls the air through the plenum 18. The throttle 14 is downstream in the air flow from the supercharger 12 and controls air flow from the throttle body 16 to the engine cylinders 15. As used herein, a first component is "downstream" in air flow from a second component if the direction of air flow requires that the air flow past the second component prior to the first component when air is directed past both components. Similarly, a first component is "upstream" in air flow from a second component if the direction of air flow requires that the air flow past the first component prior to the second component when air is directed past both components. The throttle 14 is shown downstream of the supercharger 12. It should be understood that the functionality of the supercharger 12 described herein can also be achieved if the supercharger 12 was positioned downstream of the throttle 14. In either configuration, the throttle 14 and the supercharger 12 are considered to be in series with one another in the air flow to the engine cylinders 15. Two components are "in series" with one another in the air flow to the engine 11 when air that flows past one of the components subsequently flows past the other component.

The supercharger 12 can have a set of rotors with a first rotor 26 that can mesh with a second rotor 28. Each rotor 26, 28 can have multiple lobes. The supercharger 12 can boost the air pressure upstream of the plenum 18, forcing more air into the engine cylinders 15, and thus increasing engine power. A bypass valve 34 can be selectively moveable to allow inlet air flowing through an air cleaner 21 (e.g., a filter) to bypass the supercharger 12 when engine boost is not desired. When the valve 34 is in the closed position, no air flows through bypass passage 35 so that the air inlet 74 to the rotors 26, 28 is not in fluid communication with the air outlet 78 of the rotors 26, 28 except through the supercharger 12, allowing the possibility of a pressure differential to be established by the rotors 26, 28. In other words, when the valve 34 is in a closed position, the air flow represented by arrows through bypass passage 35 cannot occur. The engine 11 of the engine assembly 10 is depicted schematically in FIGS. 6-9 as part of a vehicle 13.

The throttle 14 and the bypass valve 34 are shown as butterfly valves that are each pivotable about a respective pivot axis between a closed position and an open position. In the closed position, the throttle 14 or valve 34 is generally perpendicular to the walls of the respective surrounding throttle body 16 or bypass passage 35. In the fully open position, the throttle 14 or valve 34 is generally parallel to the walls of the respective surrounding throttle body 16 or bypass passage 35. This position is referred to as wide open throttle. The throttle 14 and bypass valve 34 can also be moved to a variety of intermediate positions between the closed position and the open position. In FIG. 1, the throttle 14 and valve 34 are each shown in an intermediate position. A controller 68A controls the operation of the throttle 14 and valve 34. The controller 68A can be an engine controller.

The supercharger 12 can be a fixed displacement supercharger, such as a Roots-type supercharger that outputs a fixed volume of air per rotation. The increased air output from the supercharger 12 then becomes pressurized when forced into the air plenum 18. A Roots-type supercharger is a volumetric device, and therefore is not dependent on rotational speed in order to develop pressure. The volume of air delivered by the Roots-type supercharger per each rotation of the supercharger rotors is constant (i.e., does not vary with speed). A Roots-type supercharger can thus develop pressure at low engine speeds because the Roots-type supercharger functions as a pump rather than as a compressor. Compression of the air delivered by the Roots-type supercharger takes place downstream of the supercharger 12 in the engine plenum 18. Alternatively, the supercharger 12 can be a compressor, such as a centrifugal-type supercharger that is dependent on rotational speed in order to develop pressure. A centrifugal-type supercharger compresses the air as it passes through the supercharger but must run at higher speeds than a Roots-type supercharger in order to develop a predetermined pressure.

The assembly 10 includes a gear arrangement that can be a planetary gear set 41 with a sun gear member 42, a ring gear member 44, and a carrier member 46 that rotatably supports a set of pinion gears 47 that can mesh with both the ring gear member 44 and the sun gear member 42. The engine crankshaft 48 can rotate with the carrier member 46 through a belt drive 49 when an engine disconnect clutch 55 is engaged to connect the crankshaft 48 with a shaft 59 rotatable by a pulley 83A that is drivingly engaged with a belt 82 of the belt drive 49. The engine disconnect clutch 55 is also referred to herein as a third clutch.

An electric motor/generator 50 can have a rotatable motor shaft 52 with a rotatable gear 54 mounted on the motor shaft 52. The motor/generator 50 is a load device as it can create a load when acting as a generator to convert torque to electric energy stored in a battery 66, and can apply a torque load when acting as a motor. The load is a variable load because the speed of the motor/generator 50 can be controlled. The motor shaft 52 is driven by a motor rotor 63. A stator 65 is mounted to a stationary member 64, such as a motor casing. The rotatable gear 54 can mesh with the ring gear member 44. The sun gear member 42 can be connectable for rotation with the first rotor 26 of the supercharger 12. The second rotor 28 also rotates when the first rotor 26 rotates due to a set of intermeshing gears 51, 53. Gear 51 is connected for rotation with the first rotor 26 and meshes with gear 53, which is connected for rotation with the second rotor 28.

The belt drive 49 may be referred to as a front engine accessory drive (FEAD) as vehicle electrical devices 80, such as electrical accessories, may also be driven by the belt 82 of the belt drive 49 either via the engine crankshaft 48 when clutch 55 is engaged and may be driven by the motor/generator 50 when the clutch 55 is not engaged, such as during an engine start/stop mode discussed herein with respect to FIG. 7, when the engine 11 is off. A pulley 83B is drivingly engaged with the belt 82 and a shaft 86 rotates with the pulley 83B to drive the electrical devices 80. Another pulley 83C is drivingly engaged with the belt 82 and drives a shaft 88 connected with the carrier 46.

Figure 2:
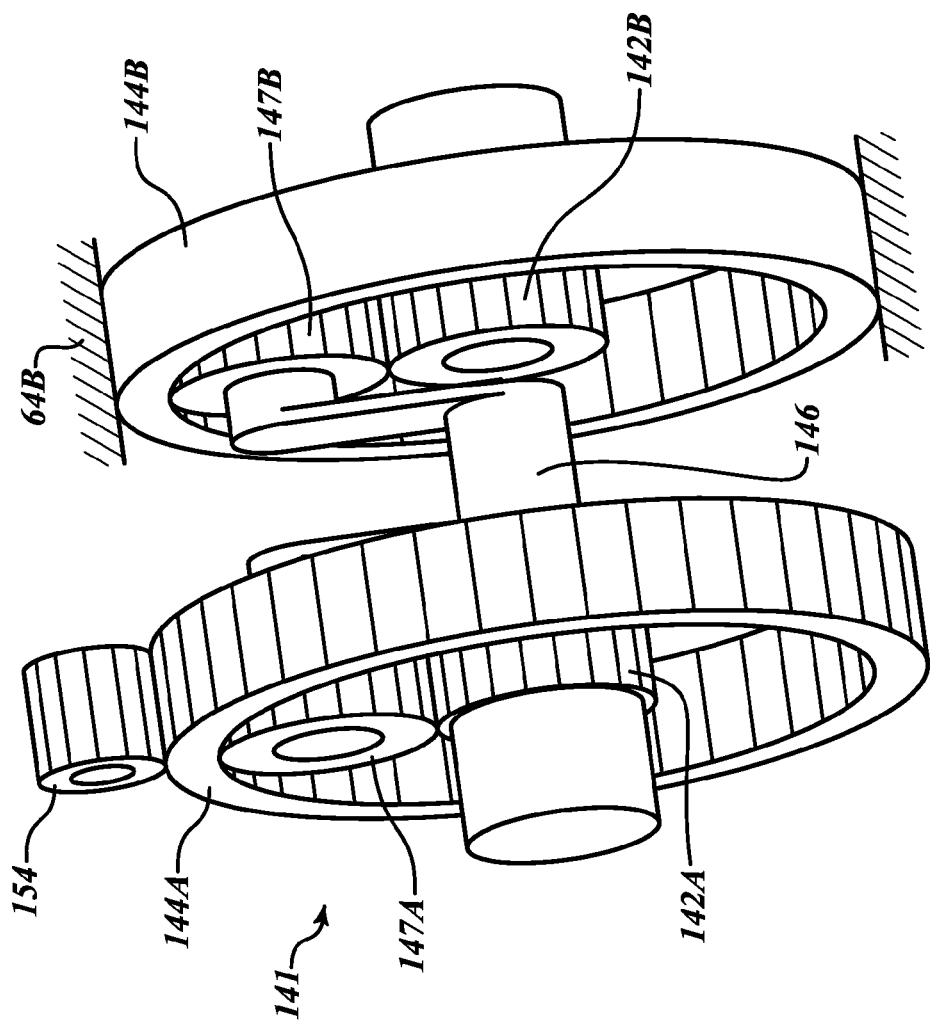
FIG. 2 is a schematic perspective illustration of a compound planetary gear set that may be used in place of the planetary gear set of FIG. 1 in accordance with an alternative aspect of the present teachings.

In certain aspects of the present teachings, the gear arrangement can be a compounded dual planetary gear set 141 as shown in FIG. 2, that can have two ring gear members 144A, 144B, two sun gear members 142A, 142B, and a common carrier member 146 that can support a first set of pinion gears 147A that can mesh with one of the ring gear members 144A and one of the sun gear members 142A, and a second set of pinion gears 147B that can mesh with the other ring gear member 144B and the other sun gear member 142B. Although each set of pinion gears 147A, 147B includes multiple pinion gears, only one pinion gear of each set of pinion gears 147A, 147B is shown for clarity in the drawing. The engine crankshaft 48 of FIG. 1 can rotate commonly with or can be connected through the belt drive 49 to the input sun gear member 142. A motor/generator like that of FIG. 1 can have a motor shaft that rotates with a rotatable gear 154 that can mesh with the input side ring gear member 144A. The rotatable gear 154 is clutched like gear 54 of FIG. 1. The ring gear member 144B is grounded to a stationary member 64B (i.e., a non-rotating member), such as the engine block. The sun gear member 142B can be connectable for rotation with the first rotor 26 of the supercharger 12 of FIG. 1.

Figure 10:
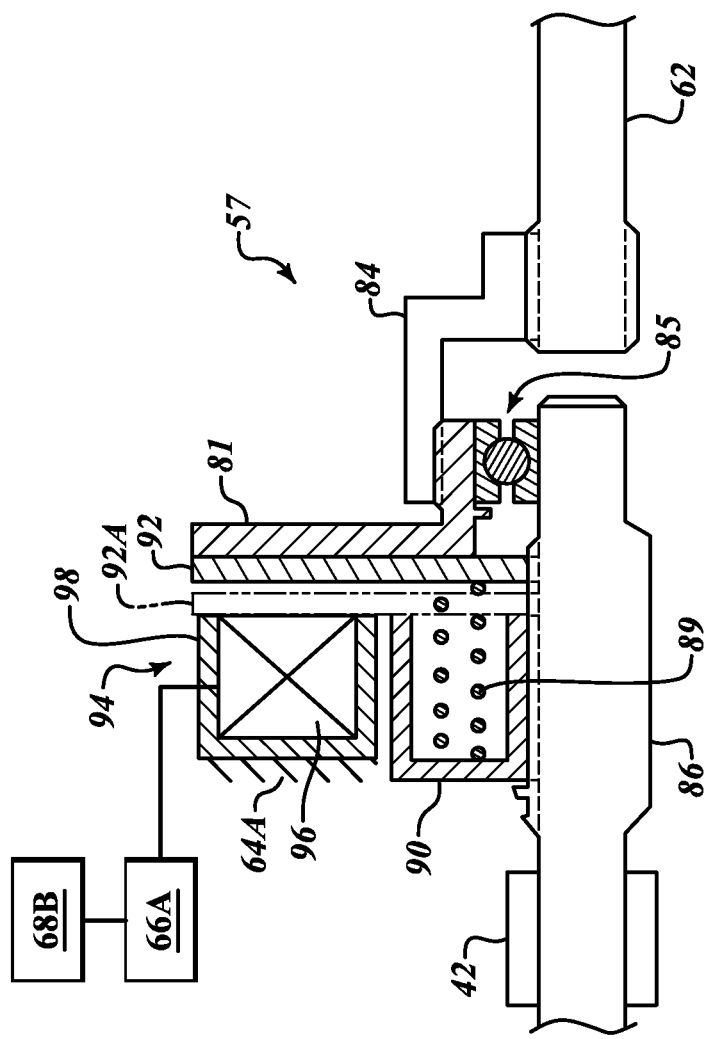
FIG. 10 is a schematic illustration of the two-position clutch of FIG. 1.

The sun gear member 42 of FIG. 1 (or the output sun gear member 142B of the alternate dual planetary gear set 141 of FIG. 2) can be selectively connectable with the first rotor 26 of the supercharger 12 by control of a two-position clutch 57 that can connect the sun gear member 42 with a shaft 62 that rotates with and can drive the rotor 26. The two-position clutch 57 is also referred to herein as a first clutch. The two-position clutch 57 can be controllable by an electronic controller 68B and an actuator 94 to move between two alternate positions as shown in FIG. 10. In a first position, the clutch 57 grounds the sun gear member 42 of FIG. 1 or the output sun gear member 142B of FIG. 2 to the stationary member 64A such as the engine block. When the clutch 57 is in the first position, the planetary gear set 41 or 141 is not operatively connected to the supercharger 12. In a second position, the clutch 57 connects the sun gear member 42 or 142A for common rotation (i.e., rotation at the same speed) as the first rotor 26 of the supercharger 12.

FIG. 10 shows the two-position clutch 57 of FIG. 1 in greater detail. The clutch 57 includes a reaction plate 81 splined to an extension 84 that is splined to the shaft 62. The reaction plate 81 is supported on a shaft 86 by a bearing 85. The sun gear member 42 is mounted on or formed with the shaft 86 and rotates with the shaft 86. A spring 89 contained in a spring housing 90 biases a friction plate 92 into engagement with the reaction plate 81. When the friction plate 92 is engaged with the reaction plate 81 as shown in FIG. 10, the clutch 57 is in the second position and the shaft 62 is thereby connected to rotate at the same speed as the sun gear member 42 through the clutch 57. The clutch 57 includes an actuator 94 with a coil 96 held in a coil support 98 mounted to a stationary member 64A, such as a housing for the gear set 41. A battery 66A can be controlled by a controller 68B to selectively energize the coil 96. The battery 66A and controller 68B can be separate from the battery 66 and controller 68 used to control the motor/generator 50. Alternatively, the same battery 66 and controller 68 can be used to control the clutch 57. When the coil 96 is energized, the friction plate 92 is pulled toward the coil 96 by magnetic force to a first position 92A, shown in phantom. The magnetic force of the energized coil 96 overcomes the force of the spring 89, and the spring 89 is compressed by the friction plate 92. In the first position 92A, the friction plate 92 is held to the stationary member 64A, braking the sun gear member 42. The friction plate 92 is not in contact with the reaction plate 82 in the first position, so that shaft 62 is not held stationary by the clutch 57.

As shown in FIG. 1, a battery 66 can be used to provide electric power to the motor/generator 50 when the motor/generator 50 is controlled to function as a motor, and to receive electrical power from the motor/generator 50 when the motor/generator 50 is controlled to function as a generator. Vehicle electrical devices 80 can also draw electric power from the battery 66. A controller 68 can control the functioning of the motor/generator 50 as a motor or as a generator. A power inverter 70 can be used to convert the energy supplied by the motor/generator 50 from alternating current to direct current to be stored in the battery 66 when the motor/generator 50 operates as a generator, and from direct current to alternating current when the motor/generator 50 operates as a motor.

The first rotor 26 of the supercharger 12 is connected to rotate with the sun gear member 42 when the two-position clutch 57 is in the second position. When in this state, a pressure differential is created across the supercharger 12 from the air inlet 74 at the first rotor 26 to the air outlet 78 at the second rotor 28. As described below, the two-way clutch 57, and the bypass valve 34 can be selectively controlled to provide a desired intake air pressure to the engine cylinders while allowing the supercharger 12 and the motor/generator 50 to be used to provide regenerative electrical energy to the battery 66 for providing power to vehicle electrical devices and/or for providing torque at the crankshaft 48 when the motor/generator 50 is controlled to function as a motor.

In a first vehicle drive mode, also referred to as a low end boosting mode that can be implemented during vehicle acceleration, the engine 11 can drive the vehicle 13 as indicated by arrow A in FIG. 6 extending from the engine 11 through the vehicle transmission 61 to the wheel axle. The engine 11 can provide tractive torque to the vehicle wheels 60 at one or both wheel axles, depending on the vehicle drivetrain. Boost can be provided by airflow through the supercharger 12 to the engine 11. When engine boost is demanded, the throttle 14 can move to a relatively more open position than shown in FIG. 1, such as in response to depression of an accelerator pedal. The rotors 26, 28 can effectively operate as a pump to increase air flow to the throttle body 16 and plenum 18 to meet operator demand. With the two-position clutch 57 grounded, the motor/generator 50 can be controlled to function as a motor or as a generator providing continuously variable transmission functionality to vary the torque at the crankshaft 48.

In a second vehicle drive mode, also indicated in FIG. 6, when high power is demanded during vehicle acceleration, the engine 11 can drive the vehicle wheels 60, as indicated by arrow A, and also drive the supercharger 12 when the clutch 57 is in the second position, as indicated by arrows B and C, thereby providing additional boost. The motor/generator 50 can be controlled to operate as a motor to adjust the boost by varying the speed of the ring gear member 44 of the gear arrangement 41 (shown in FIG. 1 and represented in FIG. 6 as a speed coupling device), as indicated by arrow D in FIG. 6.

When engine boost is not desired, the throttling losses (i.e., the pressure drop associated with the vacuum created by the moving engine cylinders) can be applied across both the throttle 14 and the supercharger 12 with the bypass valve 34 closed. The position of the throttle 14 can be balanced with the pressure drop desired across the supercharger 12 and air flows through both the supercharger 12 and past the at least partially closed throttle 14 to reach the engine cylinders 15. Alternatively, the bypass valve 34 can be closed so that all air flow to the engine 11 must flow through the supercharger 12. The position of the bypass valve 34 can be controlled to allow fast adjustments in the air flow to the engine 11 when necessary to allow at least some air to bypass the supercharger 12. The two-position clutch 57 can be placed in the second position so that torque generated by the pressure drop across the supercharger 12 will be applied to the sun gear member 42, and thus to the engine crankshaft 48 and also to the motor/generator 50 (when powered) via the torque split provided by the planetary gear set 41. This operating mode can be referred to as a throttling loss regeneration mode, and is shown schematically in FIG. 8 with recaptured throttling losses represented as arrow E used to add power to the engine crankshaft 48 when clutch 55 is engaged and clutch 57 is in the second position. Alternately or in addition, all or a portion of the recaptured throttling losses can be used to recharge the battery 66 when the motor/generator 50 is controlled to function as a generator, as indicated by arrow F.

The torque load applied by the motor/generator 50 functioning as a generator can be shown to effectively slow down the speed of the rotors 26, 28, causing the throttle 14 to open and thereby apply a pressure differential across the rotors 26, 28. That is, the vacuum created by the reciprocating pistons in the engine cylinders 15 is moved from the throttle 14 to the rotors 26, 28 when the throttle 14 is opened. The resulting pressure drop from the inlet 74 to the outlet 78 of the rotors 26, 28 creates torque at the rotors 26, 28. The rotors 26, 28 can effectively function as an air motor, extracting torque that is transferred through the planetary gear set 41 and allowing it to be converted to stored electrical energy by the motor/generator 50. During the throttling loss regeneration mode, the engine 11 can be used to power the vehicle 13 by providing tractive torque to the wheels 60, as indicated by arrow G.

Thus, at least a portion of the throttling losses can be captured as electrical energy stored in a battery 66 attached to the motor/generator 50 and/or as mechanical energy to be applied to the engine crankshaft 48. The motor/generator 50 can be controlled to operate as a generator when it is desired to charge the battery 66. This will slow the supercharger 12, and so is best implemented during vehicle operating conditions when boost is not needed, such as, but not limited to, during vehicle cruising at an engine speed of 1500 revolutions per minute (rpm) and a state-of-charge of the battery 66 less than a predetermined maximum state-of-charge threshold, allowing additional electric energy to be stored. When the state-of-charge of the battery 66 reaches a predetermined maximum level, such as but not limited to 100 percent of the charge attainable by the battery 66, the two-position clutch 57 can be placed in the first position to ground the sun gear member 42. The supercharger 12 will then freewheel. The throttle 14 can be adjusted by a controller to a position that will maintain the desired air pressure in the engine (downstream of the throttle) as all pressure drops will be across the throttle 14 when the two-position clutch 57 is in the first position. Alternatively, the clutch 57 can be designed only as a brake to stop the supercharger first rotor 26, requiring the bypass 34 to open, allowing air to bypass the supercharger 12 and flow to the throttle 14. The motor/generator 50 can be controlled to function as a motor to apply torque to the engine crankshaft 48, thus reducing the state-of-charge of the battery 66 and using the energy that was recaptured in the battery 66 via the supercharger 12. Various sensors can be used to provide crankshaft 48 torque information and battery 66 state-of-charge data to the controller 68.

When the battery state-of-charge then falls to a predetermined minimum level, such as but not limited to 80 percent of the charge attainable by the battery 66, the two-position clutch 57 can then be moved to the second position and the motor/generator 50 can again be controlled to operate as a generator so that torque is supplied through the planetary gear set 41 from the supercharger 12 to the motor/generator 50 and converted to electrical energy stored in the battery 66. When the state-of-charge again reaches the maximum level, the two-position clutch 57 can be moved back to the first position, the motor/generator 50 can operate as a motor to provide torque to the crankshaft 48, the supercharger 12 freewheels, and the throttle 14 can be adjusted to maintain the desired engine air pressure. This hybrid operating mode available during vehicle cruising is depicted schematically in FIG. 7. When clutch 55 is closed, the motor/generator 50 can thus cycle between functioning as a motor to provide power to the engine crankshaft 48 as indicated by arrow H using the stored energy from the captured throttling losses, and functioning as a generator to recharge the battery 66 of FIG. 7 during the cruising mode. The engine 11 also provides power to the vehicle wheels 60, as indicated by arrow J.

The cycle of controlling the two-position clutch 57, the throttle 14, and the motor/generator 50 during cruising is illustrated in FIGS. 3-5. FIG. 3 shows the cycle of charging (positive slope) and dissipating energy (negative slope) in the battery 66 with the state-of-charge 200 varying between a predetermined minimum level 202 (i.e., a predetermined first level) and a predetermined maximum level 204 (i.e., a predetermined second level) as time progresses. FIG. 4 shows the pressure drop across the throttle 14 that corresponds with the charging and dissipating of the battery 66. The pressure drop 206 across the throttle 14 is relatively low at level 208 when the battery 66 is charging, as the throttle 14 is moved to a more open position when some of the total pressure drop is placed across the supercharger 12. The pressure drop across the throttle 14 is at a relatively high level 210, with the throttle 14 being adjusted to a less open position, when the battery 66 is dissipating as the supercharger 12 is freewheeling and all pressure drop necessary to maintain the desired engine air pressure is across the throttle 14.

The period 218 of the cycle shown in FIG. 3 can be adjusted by controlling the torque load of the motor/generator 50 when operated as a generator to a lower level, thus charging the battery 66 at a slower rate, or by increasing the range between the minimum level 202 of the state-of-charge and the maximum level 204 of the state-of-charge. The pressure drop 212 across the supercharger 12 is relatively high at level 214 when the battery 66 is charging, as the throttle 14 is moved to a more open position when some of the total pressure drop is placed across the supercharger 12. The pressure drop across the supercharger 12 is at a relatively low level 216, with the throttle 14 being adjusted to a less open position, when the battery 66 is dissipating as the supercharger 12 is freewheeling and all pressure drop necessary to maintain the desired engine air pressure is across the throttle 14.

In another aspect of the present teachings, as an alternative to cycling between a maximum and a minimum state-of-charge of the battery 66 during vehicle cruising, the motor/generator 50 can be controlled so that the rate of electrical energy regenerated is balanced against the energy used by the vehicle electrical components, keeping the state-of-charge in the battery 66 relatively constant. The regeneration rate and associated torque drag by the motor/generator 50 can be balanced against torque applied by the supercharger 12 to the engine crankshaft 48 to avoid or minimize the cyclical charging and dissipating pattern during vehicle cruising.

In lieu of a motor/generator 50, one or more alternative controllable load devices can be operatively connected at the ring gear member 44 or 144B of FIG. 2. For example, an accumulator with a hydraulic or pneumatic pump, a slippable friction clutch, or a spring can be operatively connected to the ring gear member 44 or 144B and can be controlled to capture throttling loss energy via the supercharger 12. In the case of an accumulator, the energy can be stored as hydraulic or pneumatic pressure. In the case of a slippable friction clutch, the energy can be converted to heat by slipping the clutch, and can then be captured for use in vehicle heating and cooling systems. The load applied by the motor/generator 50, accumulator, spring, or slipping clutch can also slow the sun gear member 42 or 142B and connected supercharger 12, and can be controlled to manage air flow into the engine especially at high speeds when there can be excess air flow to the engine.

Additionally, the motor/generator 50 can be controlled to function as a motor to start the engine when the two-position clutch 57 is placed in the first position to ground the sun gear member 42 or 142B and the clutch 55 is engaged. FIG. 7 illustrates the engine start-stop mode with arrow H depicting powerflow from the motor/generator 50 to start the engine 11. For example, if the engine 11 is shutoff at a stop light, the motor/generator 50 can be used to restart the engine. Thus, fuel savings can be realized during the period that the engine 11 is shutoff, and restarting the engine can be accomplished with the electric energy generated from recaptured throttling losses. The engine can provide torque to charge the motor/generator 50 through the planetary gear set 41 or 141 when the motor/generator 50 is controlled to function as a generator and the two-position clutch 57 is in the first position to ground the sun gear member 42.

The crankshaft 48 can provide torque to run the supercharger 12 through the planetary gear set 41 when a selectively engageable dog clutch 79 is engaged to ground the gear member 54 to the stationary member 64, thus also holding the ring gear member 44 and the motor/generator 50 stationary. The dog clutch 79 is also referred to herein as a second clutch. Alternatively, the motor/generator 50 can be held stationary by applying torque to stall the motor/generator 50 through the control of electrical energy to the motor/generator 50. However, the dog clutch 79 can be used to avoid the use of stored electrical energy to hold the motor/generator 50 stationary. Additionally, braking energy can be recaptured in a regenerative braking mode, with torque at the crankshaft 48 being recaptured as stored energy in the battery 66 when the motor/generator 50 is controlled to function as a generator and the clutch 55 is engaged. The regenerative braking mode is schematically depicted in FIG. 9 with arrow K representing energy from the wheels 60 to the battery 66.

The reference numbers used in the drawings and the specification and the corresponding components are as follows:

10 assembly
  11 engine
  12 supercharger
  13 vehicle
  14 throttle
  15 cylinder
  16 throttle body
  18 plenum
  20 manifold
  21 air cleaner
  26 first rotor
  28 second rotor
  34 bypass valve
  35 bypass passage
  41 planetary gear set
  42 sun gear member
  44 ring gear member
  46 carrier member
  47 pinion gears
  48 crankshaft
  49 belt drive
  50 motor/generator
  51 gear
  52 motor shaft
  53 gear
  54 rotatable gear
  55 engine disconnect clutch
  57 two-position clutch
  59 shaft
  60 wheels
  61 transmission
  62 shaft
  63 motor rotor
  64A stationary member
  64B stationary member
  65 stator
  66 battery
  68 controller
  68A controller
  68B controller
  70 inverter
  74 air inlet
  78 air outlet
  79 dog clutch
  80 vehicle electrical devices
  81 reaction plate
  82 belt
  83A pulley
  83B pulley
  83C pulley
  84 extension
  85 bearing
  86 shaft
  88 shaft
  89 spring
  90 spring housing
  92 friction plate
  92A first position
  94 actuator
  96 coil
  98 coil support
  141 compound dual-planetary gear set
  142A sun gear member
  142B sun gear member
  144A ring gear member
  144B ring gear member
  146 carrier
  147A pinion gears
  147B pinion gears
  154 rotatable gear
  200 state-of-charge
  202 predetermined first minimum level
  204 predetermined second maximum level
  206 throttle pressure drop
  208 low pressure level
  210 high pressure level
  212 supercharger pressure drop
  214 high pressure level
  216 low pressure level
  218 period While the best modes for carrying out the many aspects of the present teachings have been described in detail, those familiar with the art to which these teachings relate will recognize various alternative aspects for practicing the present teachings that are within the scope of the appended claims.

What is claimed is:

1. An assembly for controlling air flow to an engine having a crankshaft, cylinders and a throttle in a throttle body positioned in air flow to the cylinders, the assembly comprising:

a supercharger having a set of rotors in series with the throttle in the air flow to the engine;
a load device; and
a gear arrangement having a first member operatively connected with the load device, a second member operatively connectable with the crankshaft, and a third member operatively connectable with the supercharger, wherein the gear arrangement is a compounded, dual-planetary gear set having a first and a second ring gear member, a first and a second sun gear member, a common carrier member that supports a first set of pinion gears that mesh with the first ring gear member and the first sun gear member and supports a second set of pinion gears that mesh with the second ring gear member and the second sun gear member, wherein the first member operatively connectable with the load device is the first ring gear member; wherein the second member operatively connectable with the crankshaft is the first sun gear member, and wherein the third member operatively connectable with the supercharger is the second sun gear member;
wherein the load device is selectively controllable to vary a speed of rotation of the rotors through the gear arrangement to thereby cause the throttle to open so that a pressure drop across the throttle shifts to the rotors, creating torque on the rotors, throttling losses thereby being regenerated.

2. The assembly of claim 1, further comprising a clutch controllable to move between a first position and a second position, wherein the clutch is operable to ground the third member with a stationary member when in the first position and to operatively connect the third member with the rotors when in the second position so that the torque on the rotors is provided to the load device through the gear arrangement when the clutch is in the second position.

3. The assembly of claim 2, wherein the clutch is a first clutch, and further comprising:
a second clutch selectively engageable to operatively connect the first member to a stationary member, thereby holding the first member stationary; and
a third clutch selectively engageable to operatively connect the crankshaft with the second member;
wherein at least a portion of the torque on the rotors is applied to the crankshaft through the gear arrangement when the first clutch is in the second position and the second and third clutches are engaged.

4. The assembly of claim 3, wherein the load device is a motor/generator operable to alternately function as a motor and as a generator; and further comprising:
a controller configured to control the motor/generator to alternatively function as a motor and as a generator;
wherein the motor/generator is controlled by the controller to function as a motor when the first clutch is in the first position, the second clutch is not engaged, and the third clutch is engaged, thereby applying torque to the crankshaft through the gear arrangement to start the engine.

5. The assembly of claim 2, wherein the clutch is a first clutch, and further comprising:
a second clutch selectively engageable to operatively connect the first member to a stationary member, thereby holding the first member stationary; and
a third clutch selectively engageable to operatively connect the crankshaft with the second member;
wherein the engine thereby drives the supercharger through the gear arrangement when the first clutch is in the second position and the second and third clutches are engaged.

6. The assembly of claim 1, wherein the load device is a motor/generator operable to selectively function as a motor or as a generator, and further comprising:
a controller configured to control the motor/generator to alternatively function as a motor and as a generator;
a first clutch controllable to move between a first position and a second position, wherein the first clutch is operable to ground the third member with a stationary member when in the first position and to operatively connect the third member with the rotors when in the second position;
a second clutch selectively engageable to operatively connect the first member to a stationary member, thereby holding the first member stationary; and
a third clutch selectively engageable to operatively connect the crankshaft with the second member, the engine driving the supercharger through the gear arrangement to provide engine boost and the controller controlling the motor/generator to vary a speed of the third member to thereby vary the engine boost when the first clutch is in the second position, the third clutch is engaged, and the second clutch is not engaged.

7. The assembly of claim 1, further comprising:
a first clutch controllable to move between a first position and a second position, wherein the first clutch is operable to ground the third member with a stationary member when in the first position and to connect the third member to rotate with the rotors when in the second position;
a second clutch selectively engageable to operatively connect the first member to a stationary member, thereby holding the first member stationary;
a third clutch selectively engageable to operatively connect the crankshaft with the second member; and
a controller;
wherein the load device is a motor/generator operable, and the controller is configured to control the motor/generator selectively as a motor or as a generator; and
wherein the motor/generator is controlled by the controller to function as a generator when the first clutch is in the first position, the second clutch is not engaged, and the third clutch is engaged to thereby provide torque from the crankshaft through the gear arrangement to the generator in a regenerative braking mode.

8. The assembly of claim 1, wherein the first member is a ring gear member, the second member is a carrier member, and the third member is a sun gear member.

9. The assembly of claim 8, wherein the load device is a motor/generator operable to alternately function as a motor and as a generator.

10. The assembly of claim 9, further comprising:
a controller operatively connected to the motor/generator and configured to control the motor/generator to alternately function as a motor and as a generator; and
a battery operatively connected to the controller and the motor/generator;
wherein the throttle is open and the motor/generator is controlled to function as a generator to convert the torque on the rotors to energy stored in the battery during constant engine speeds when a state-of-charge of the battery reaches a predetermined first level and until the state-of-charge of the battery reaches a predetermined second level higher than the predetermined first level, and the throttle is less open and the motor/generator is controlled to function as a motor to provide torque at the crankshaft when the state-of-charge of the battery reaches the predetermined second level and until the state-of-charge of the battery again reaches the predetermined first level.

11. The assembly of claim 9, further comprising:
a controller operatively connected to the motor/generator and configured to control the motor/generator to alternately function as a motor and as a generator; and
a battery operatively connected to the controller and the motor/generator and configured to store energy converted from the torque on the rotors by the motor/generator when the motor/generator is controlled to function as a generator;
wherein at least one vehicle electrical device is operatively connected to the battery and is configured to receive stored energy from the battery; and
wherein a rate of energy stored in the battery that is converted from the torque at the rotors is equal to the rate of stored energy in the battery received as electrical power by said at least one vehicle electrical device.

12. An assembly for controlling air flow to an engine having a crankshaft, cylinders, and a throttle in a throttle body upstream in air flow to the cylinders, the assembly comprising:
a supercharger having a set of rotors in series with the throttle in the air flow to the engine;
a motor/generator operable to alternately function as a motor and as a generator;
a controller configured to control the motor/generator to alternatively function as a motor and as a generator;
a gear arrangement having a first member operatively connected with the motor/generator, a second member operatively connectable with the crankshaft, and a third member operatively connectable for rotation with the supercharger; and
a battery operatively connected to the controller and the motor/generator and configured to store energy converted from the torque on the rotors by the motor/generator when the motor/generator is controlled to function as a generator, throttling losses thereby being regenerated as stored energy in the battery;
wherein the motor/generator is selectively controllable to vary a speed of rotation of the rotors through the gear arrangement to thereby cause the throttle to open so that a pressure drop across the throttle shifts to the rotors, creating torque on the rotors;
wherein the throttle is open and the motor/generator is controlled to function as a generator to convert the torque on the rotors to energy stored in the battery during constant engine speeds when a state-of-charge of the battery reaches a predetermined first level and until the state-of-charge of the battery reaches a predetermined second level higher than the predetermined first level, and wherein the throttle is less open and the motor/generator is controlled to function as a motor to provide torque at the crankshaft when the state-of-charge of the battery reaches the predetermined second level and until the state-of-charge of the battery again reaches the predetermined first level.

13. The assembly of claim 12, wherein the gear arrangement is a simple planetary gear set, and the first member is a ring gear member, the second member is a carrier member, and the third member is a sun gear member.

14. An assembly for controlling air flow to an engine having a crankshaft, cylinders and a throttle in a throttle body positioned in air flow to the cylinders, the assembly comprising:
a supercharger having a set of rotors in series with the throttle in the air flow to the engine;
a motor/generator operable to alternately function as a motor and as a generator;
a gear arrangement having a first member operatively connected with the motor/generator, a second member operatively connectable with the crankshaft, and a third member operatively connectable with the supercharger; and
a controller configured to control the motor/generator to alternatively function as a motor and as a generator;
a first clutch;
a second clutch selectively engageable to operatively connect the first member to a stationary member, thereby holding the first member stationary; and
a third clutch selectively engageable to operatively connect the crankshaft with the second member;
wherein the clutch is controllable to move between a first position and a second position, wherein the clutch is operable to ground the third member with a stationary member when in the first position and to operatively connect the third member with the rotors when in the second position so that the torque on the rotors is provided to the motor/generator through the gear arrangement when the clutch is in the second position;
wherein at least a portion of the torque on the rotors is applied to the crankshaft through the gear arrangement when the first clutch is in the second position and the second and third clutches are engaged.

15. The assembly of claim 14, further comprising:
a controller configured to control the motor/generator to alternatively function as a motor and as a generator;
a second clutch selectively engageable to operatively connect the first member to a stationary member, thereby holding the first member stationary; and
a third clutch selectively engageable to operatively connect the crankshaft with the second member, the engine driving the supercharger through the gear arrangement to provide engine boost and the controller controlling the motor/generator to vary a speed of the third member to thereby vary the engine boost when the first clutch is in the second position, the third clutch is engaged, and the second clutch is not engaged.

16. The assembly of claim 14, wherein the first member is a ring gear member, the second member is a carrier member, and the third member is a sun gear member.

17. The assembly of claim 14, wherein the gear arrangement is a compounded, dual-planetary gear set having a first and a second ring gear member, a first and a second sun gear member, a common carrier member that supports a first set of pinion gears that mesh with the first ring gear member and the first sun gear member and supports a second set of pinion gears that mesh with the second ring gear member and the second sun gear member; and
wherein the first member operatively connectable with the motor/generator is the first ring gear member; wherein the second member operatively connectable with the crankshaft is the first sun gear member, and wherein the third member operatively connectable with the supercharger is the second sun gear member.

* * * * *